(12) United States Patent
Hira

(10) Patent No.: US 12,154,116 B2
(45) Date of Patent: *Nov. 26, 2024

(54) SMART CARD AUTHENTICATION SYSTEM

(71) Applicant: Capital One Services, LLC, McLean, VA (US)

(72) Inventor: Manish Hira, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,148

(22) Filed: Oct. 30, 2023

(65) Prior Publication Data
US 2024/0062217 A1 Feb. 22, 2024

Related U.S. Application Data

(63) Continuation of application No. 17/517,732, filed on Nov. 3, 2021, now Pat. No. 11,836,733.

(51) Int. Cl.
*G06Q 20/40* (2012.01)
*G06F 21/32* (2013.01)

(52) U.S. Cl.
CPC .......... *G06Q 20/405* (2013.01); *G06F 21/32* (2013.01); *G06Q 20/40145* (2013.01)

(58) Field of Classification Search
CPC .......... G06Q 20/405; G06Q 20/40145; G06Q 20/2295; G06Q 20/341; G06Q 20/34; G06F 21/32

See application file for complete search history.

(56) References Cited

U.S. PATENT DOCUMENTS

| 6,591,249 B2 | 7/2003 | Zoka |
| 8,360,322 B2 | 1/2013 | Bonalle et al. |

(Continued)

FOREIGN PATENT DOCUMENTS

| EP | 3179432 A1 * | 6/2017 | ......... G06Q 20/2295 |
| WO | WO-2015027216 A1 * | 2/2015 | ......... G06F 21/6218 |

OTHER PUBLICATIONS

Method and Apparatus for Mobile Identity Authentication an IP.com Prior Art Database Technical Disclosure Authors et. al.: Disclosed Anonymously IP.com No. IPCOM000194545D (Year: 2010).*

(Continued)

*Primary Examiner* — Scott C Anderson
*Assistant Examiner* — James H Miller
(74) *Attorney, Agent, or Firm* — Banner & Witcoff, Ltd.

(57) ABSTRACT

Aspects described herein may allow for authentication of smart card usage. A server may receive, from a first computing device associated with a first user, a delegation request to delegate an authority, to a second user, to use a secondary card associated with an account belonging to the first user. The first user may hold a primary card associated with the account and the delegation request comprises one or more limitations on the authority. The server may also receive, via a sensor on the secondary card, first biometric information associated with the second user. The server may authenticate subsequent transaction requests based on the first biometric information and one or more limitations. In this way, the system may provide account holders with the flexibility to authorize other users to use the account while minimizing the risk of being exposed to fraudulent requests.

20 Claims, 5 Drawing Sheets

(56) References Cited

U.S. PATENT DOCUMENTS

| | | | |
|---|---|---|---|
| 10,909,518 B2 * | 2/2021 | Mardikar | G06Q 20/202 |
| 11,132,693 B1 * | 9/2021 | Sahni | G06Q 20/10 |
| 11,321,445 B2 * | 5/2022 | Arora | G06F 21/45 |
| 11,704,632 B2 * | 7/2023 | Gadewar | G06Q 20/405 705/44 |
| 2004/0232220 A1 | 11/2004 | Beenau et al. | |
| 2006/0163344 A1 * | 7/2006 | Nwosu | G07F 7/1008 235/380 |
| 2007/0073619 A1 | 3/2007 | Smith | |
| 2010/0094754 A1 * | 4/2010 | Bertran | G06Q 40/02 235/494 |
| 2010/0138344 A1 * | 6/2010 | Wong | G06Q 20/385 705/35 |
| 2011/0106698 A1 * | 5/2011 | Isaacson | G06Q 30/02 705/41 |
| 2011/0178924 A1 * | 7/2011 | Briscoe | G06Q 20/409 705/41 |
| 2013/0024364 A1 * | 1/2013 | Shrivastava | G06Q 20/02 705/39 |
| 2014/0081854 A1 * | 3/2014 | Sanchez | G06Q 20/42 705/16 |
| 2014/0114856 A1 * | 4/2014 | Jung | G06Q 20/3278 705/44 |
| 2014/0250018 A1 * | 9/2014 | Phillips | G06Q 20/405 705/72 |
| 2014/0258010 A1 | 9/2014 | Mardikar et al. | |
| 2014/0351130 A1 * | 11/2014 | Cheek | G06Q 20/29 705/44 |
| 2015/0012436 A1 * | 1/2015 | Poole | G06Q 20/3278 705/44 |
| 2015/0178725 A1 * | 6/2015 | Poetsch | G06Q 20/3572 705/44 |
| 2017/0186014 A1 | 6/2017 | Nowak et al. | |
| 2018/0033013 A1 * | 2/2018 | Park | G06Q 20/4097 |
| 2018/0089688 A1 * | 3/2018 | Kohli | G06Q 20/4016 |
| 2018/0225666 A1 * | 8/2018 | Khan | G06Q 20/405 |
| 2019/0080325 A1 * | 3/2019 | Pourfallah | G06Q 20/3276 |
| 2019/0213311 A1 * | 7/2019 | Tussy | G06V 10/17 |
| 2019/0347665 A1 * | 11/2019 | Agrawal | G06F 3/0482 |
| 2019/0370448 A1 * | 12/2019 | Devine | G06V 40/67 |
| 2019/0370787 A1 | 12/2019 | Mueller et al. | |
| 2019/0392444 A1 * | 12/2019 | Butler | G06Q 20/387 |
| 2020/0074447 A1 * | 3/2020 | Isaacson | G06Q 20/10 |
| 2020/0202423 A1 * | 6/2020 | Boukadakis | G06V 30/416 |
| 2020/0211016 A1 * | 7/2020 | Ju | G06Q 40/02 |
| 2020/0219082 A1 * | 7/2020 | Givol | G06T 7/11 |
| 2021/0295335 A1 * | 9/2021 | Long | G06Q 20/385 |
| 2021/0326426 A1 * | 10/2021 | Bouse | G06F 16/2379 |
| 2021/0328990 A1 | 10/2021 | Ju et al. | |
| 2021/0342840 A1 * | 11/2021 | Rule | H04W 12/06 |
| 2022/0005039 A1 * | 1/2022 | Hires | G06Q 20/4014 |
| 2022/0147967 A1 * | 5/2022 | Clark | G06Q 20/227 |
| 2023/0047509 A1 * | 2/2023 | Dhodapkar | G06Q 20/24 |

OTHER PUBLICATIONS

Secure Brokered Delegation Through DelagaTEE (2019) (Year: 2019).*

"Method and Apparatus for Mobile Identity Authentication" An IP.com Prior Art Database Technical Disclosure, IP.com No. IPCOM000194545D, Year 2010.

Feb. 21, 2023—(WO) International Search Report and Written Opinion—PCT/US2022/048436.

Moritz Schneider et al. "Secured Brokered Delegation Through DelagaTEE" Year 2019, pp. 1-10.

* cited by examiner

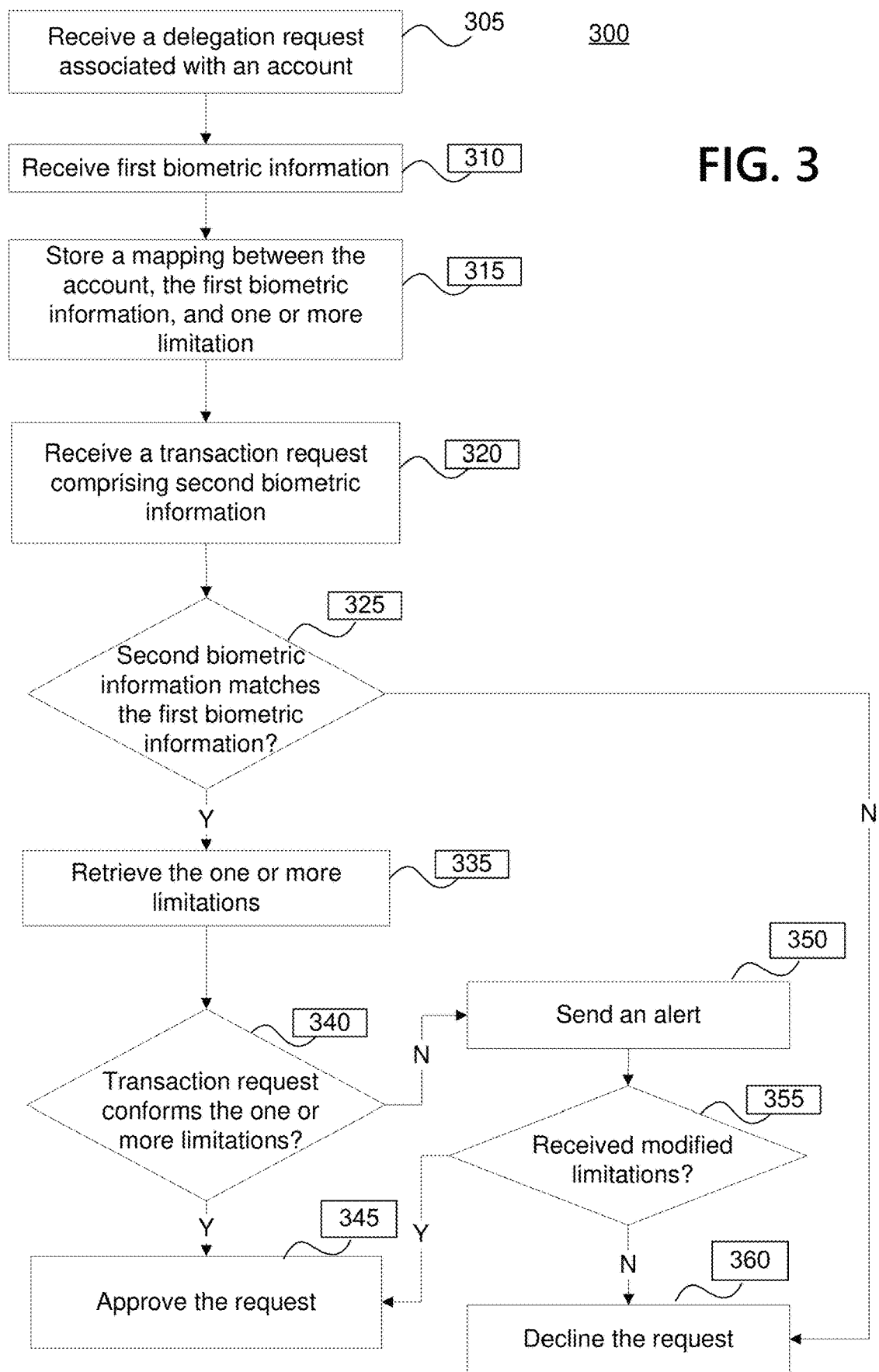

SMART CARD AUTHENTICATION SYSTEM

CROSS-REFERENCE TO RELATED APPLICATIONS

The present application is a continuation of U.S. application Ser. No. 17/517,732, filed on Nov. 3, 2021, and entitled "Smart Card Authentication System," the entirety of which is herein incorporated by reference.

FIELD OF USE

Aspects of the disclosure relate generally to data processing, and hardware and software related thereto. More specifically, aspects of the disclosure may provide systems and methods for authenticating smartcard usage.

BACKGROUND

To prevent fraudulent transactions, a credit card is often allowed to be used only by the account holder who holds an account associated with the credit card. For example, a signature of the account holder is often required while the credit card is used to make transaction requests. However, the account holder may want to authorize other users to use his account from time to time. For example, an elder may want to authorize his neighbor to purchase items in a nearby store using the elder's account. In the current system, if the neighbor uses the credit card of the elder to make the purchase at the store, the system would deny the purchase because the system would not be able to determine whether the neighbor is authorized to make the purchase or not. The system may not be able to determine whether the credit card was stolen by the neighbor. If the system does not deny the transaction, the system may be exposed to a risk of a fraudulent transaction.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

If an account holder wants to authorize a non-account holder to use his account and therefore provides his own credit card associated with the account to the non-account holder, it would be difficult for an authentication system to determine whether requested transactions, made via the credit card and by the non-account holder, are fraudulent or not. If the authentication system approves such a transaction, the authentication system may be exposed to a great risk that the transaction request is either fraudulent or otherwise not authorized. If the authentication system denies such a transaction, the account holder loses the flexibility to authorize other users to use his account, which imposes inconvenience to the account holder.

To overcome the limitations described above, and to overcome other limitations that will be apparent upon reading and understanding the present specification, aspects described herein are directed towards authenticating card usage by providing the non-account holder a secondary card and storing, in the authentication system, a mapping between the secondary card, the biometric information of the non-account holder, and one or more limitations on the authority to use the account by the non-account holder. The biometric information, and one or more limitations on the authority to use the account, may be retrieved subsequently when a user uses the secondary card to make transaction requests. The stored biometric information and the one or more limitations may be used to authenticate the transaction. This allows a flexible system that provides account holders the ability to conveniently delegate the authority to other users to use the account without creating significant risks to fraudulent transactions.

Aspects discussed herein may provide a computer-implemented method for authenticating card usage. In at least one implementation, a computing device may receive, from a first computing device associated with a first user, a delegation request to delegate an authority, to a second user, to use a secondary card associated with an account belonging to the first user. The first user may hold a primary card associated with the account, and the delegation request may comprise one or more limitations on the authority. The computing device may receive, via a sensor on the secondary card, first biometric information associated with the second user. The computing device may store, in a database, a mapping between the account and the first biometric information, the secondary card, and the one or more limitations. The computing device may receive a transaction request associated with the secondary card, wherein the transaction request comprises second biometric information. The computing device may compare the second biometric information to the first biometric information to determine whether the second biometric information matches the first biometric information. The computing device may retrieve, from the database and based on a determination that the second biometric information matches the first biometric information, the one or more limitations. The computing device may determine whether the transaction request conforms with the one or more limitations. The computing device may approve, based on a determination that the transaction request conforms with the one or more limitations, the transaction request.

In some instances, the one or more limitations comprises at least one of: a time period during which the second user is authorized to use the secondary card; a geographical area within which the second user is authorized to use the secondary card; or a number of transactions for which the second user is authorized to use the secondary card.

In some instances, the account may be a credit account, and the one or more limitations may comprise a maximum spending amount.

In some instances, the computing device may further receive a second transaction request associated with the secondary card, wherein the second transaction request comprises third biometric information and may send, to the first user and based on a determination that the third biometric information does not match the first biometric information, an alert.

In some instances, the computing device may receive a second transaction request associated with the secondary card, wherein the second transaction request comprises third biometric information, and may retrieve, from the database and based on a determination that the third biometric information matches the first biometric information, the one or more limitations. The computing device may send, to the first user and based on a determination that the second transaction request exceeds the one or more limitations, an alert. The alert may comprise a prompt to modify the one or more limitations.

In some instances, the computing device may receive, from the first computing device, a response to the alert. The response may comprise an indication to modify the one or more limitations. The computing device may approve, based on the response, the second transaction request.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an exemplary flow chart for authenticating card usage in accordance with one or more aspects discussed herein;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for authorizing card usage.

Before discussing these concepts in greater detail, however, several examples of a computing device that may be used in implementing and/or otherwise providing various aspects of the disclosure will first be discussed with respect to FIG. 1.

Figure 1:
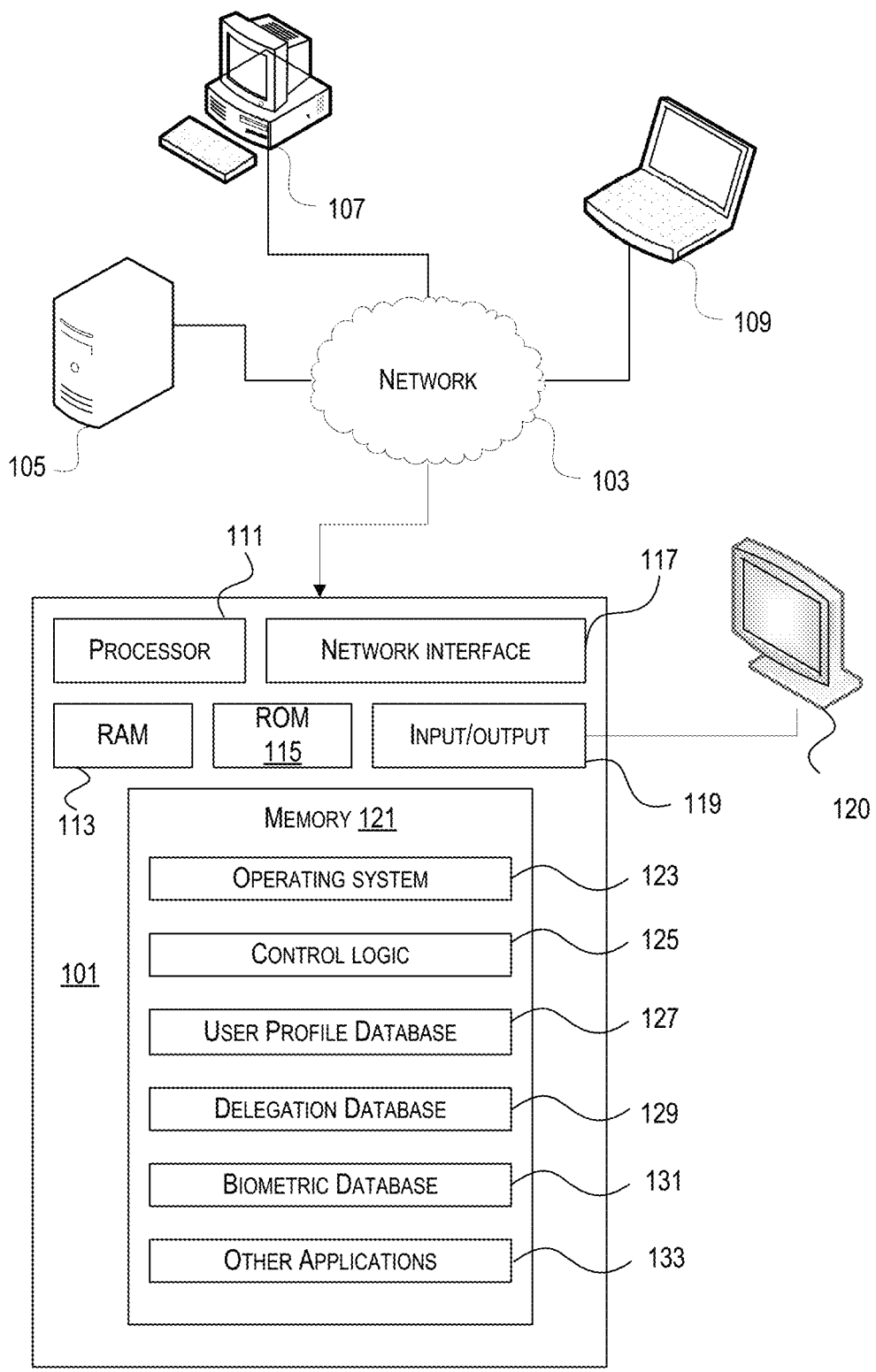
FIG. 1 depicts an example of a computing device in accordance with one or more aspects described herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associating with functions described herein. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, user profile database 127, delegation database 129, biometric database 131, and other applications 133 may be stored in a memory of a computing device used at a server system that will be described further below. The databases referred to above may include, but are not limited to relational databases, hierarchical databases, distributed databases, in-memory databases, flat file databases, XML databases, NoSQL databases, graph databases, and/or a combination thereof. Control logic 125 may be incorporated in and/or may comprise a linking engine that updates, receives, and/or associates various information stored in the memory 121. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, Perl, etc. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

Figure 2:
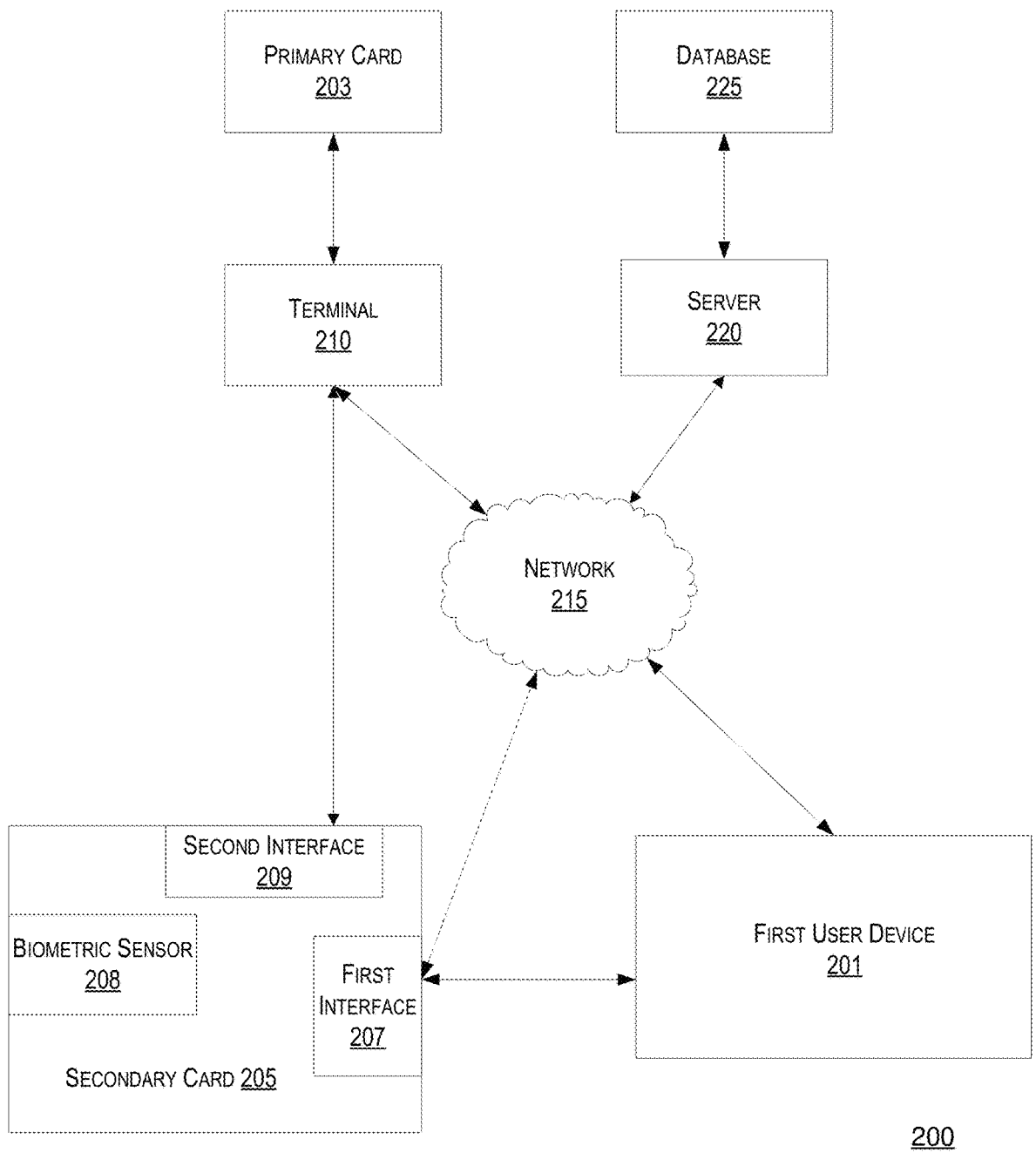
FIG. 2 depicts an example of a computing environment in which one or more aspects described herein may be implemented.

FIG. 2 depicts a computing environment 200 in which one or more aspects described herein may be implemented. Referring to FIG. 2, computing environment 200 may include one or more computer systems. For example, computing environment 200 may include a first user device 201, a primary card 203, a secondary card 205, a terminal 210, and a server 220 interconnected via network 215. Each of the first user device 201, the primary card 203, the secondary card 205, the terminal 210 and the server 220 may comprise one or more computing devices 101 in FIG. 1.

The server 220 may be a stand-alone server, a corporate server, or a server located in a server farm or cloud-computer environment. According to some examples, server 220 may be a virtual server hosted on hardware capable of supporting a plurality of virtual servers. The server 220 may be associated with a financial institution, such as a card issuer. The server 202 may be communicatively coupled to one or more databases 225 configured to store information associated with a plurality of accounts. Each account may have one or more account holders. The server 220 may be configured to manage the accounts and authenticate transaction requests associated with the accounts as described herein.

A first user may hold an account and a primary card 203 associated with the account. The account may be managed by the server 220. The account may be used for any one or more of a variety of purposes. For example, the account may be a bank account. A primary card 203 (e.g., a credit card, a debit card, or a value-stored card) may be associated with the account and held by the first user. In another example, the account may be a security account recording the first user's authority to access certain buildings. A primary card 203 may be an identification card linked with the security account. The first user may swipe the primary card 203 to enter one or more buildings. The primary card may be used by the first user to make transaction requests via terminal 210. The terminal 210 may be a computing device configured to communicated with the primary card 203, and send transaction requests associated with the account to the server 220. For example, the terminal 210 may be a payment terminal (e.g., a point-of-sale (POS) machine, a point-of-purchase (POP) machine), an access control terminal (e.g., an electronic door locks), or any other terminals that may be communicated with a smart card.

The first user may also be associated with a first user device 201. The first user device 201 may be a mobile device, such as a cellular phone, a mobile phone, a smart phone, a tablet, a laptop, or an equivalent thereof. First user device 110 may provide a first user with access to various applications and services. For example, first user device 201 may be used, by the first user, to communicate with the server 220 via network 215 in order to access the first user's account.

If a first user wants to delegate an authority to use the account to a second user (e.g., delegate the authority to use the money in the bank account of the first user to purchase items), the first user may initiate, via the first user device 201, a delegation process. During the delegation process, the first user may associate a secondary card 205, belonging to the first user, with the second user. The first user may also set one or more limitations associated with the delegation, as discussed in further detail below. The secondary card 205 may be any suitable card configured to permit the second user to use the first user's account. The secondary card 205 may be a smart card (e.g., an integrated circuit card) and may be used as a credit card, a charge card, a debit card, a prepaid card, an identification card, or the like. In some examples, the secondary card 205 may provide access to one or more types of accounts.

During the delegation process, the server 220 may receive (e.g., collect, obtain) the biometric information associated with the second user and store a mapping between the account, the biometric information of the second user, the secondary card 205, and/or the one or more limitations. The mapping may be retrieved, for example, if the server 220 receives subsequent transaction requests associated with the secondary card 205. The mapping may be used to authenticate the transaction requests (e.g., by comparing the biometric information stored in the mapping and the biometric information collected while the transaction request was made).

The biometric information of the second user may be received (e.g., collected, obtained) in any one or more of a variety of ways. For example, the biometric information of the second user may be collected via the first user device 201. For example, the biometric information may be certain characteristics associated with the second user's face, and a photo of the second user may be taken via a camera of the first user device 201 and then sent to server 220 via the network 215.

In another example, the biometric information of the second user may be collected via the secondary card 205. As shown in FIG. 2, the secondary card 205 may comprise one or more biometric sensors 208 configured to obtain (e.g., collect) biometric information (e.g., fingerprint, face, hair color, skin tone, facial features, visual appearance—such as body and/or body shape, resting pulse rate, blood oxygen level, blood pressure, blood sample, DNA sample, glucose reading, body fat percentage, etc.) of a user as described herein. For example, the second user may touch the biometric sensor 208 with the finger of the second user in order to have the fingerprint scanned (e.g., collected) by the secondary card 205. The secondary card 205 may send the biometric information to the server 220 directly or send the biometric information to first user device 201, which may subsequently send the biometric information to the server 220. The communication between the secondary card 205, the server 220, and/or the first user device 201 may be made via a first interface 207 on the secondary card 205. For example, the first interface 207 may be an NFC interface (e.g., an RFID transmitter) or a Bluetooth® transmitter. The first interface 207 may be configured to transmit data (e.g., data associated with the biometric information of the second user) to the first user device 201. The biometric information may be sent via the first user device 201 to the server 220. Alternatively, the first interface 207 may comprise a network interface (e.g., a 5G network interface) configured to communicate with the server 220 via the network 215 directly. The data associated with the biometric information of the second user may be sent to the server 220 directly via the network 215.

In yet another example, the biometric information may be collected via a second user device (not shown in FIG. 2). The second user device may be associated with the second user and may receive a secured link from the server 220 or from the first user device 201. The biometric information collected may be uploaded to the server 220 via the secured link.

After the delegation process is completed, the second user may use the secondary card 205 to make transactions associated with the account of the first user. For example, a transaction request may be made via terminal 210. The secondary card 205 may comprise a second interface 209 configured to communicate with the terminal 210. The second interface 209 may be a magnetic strip. Alternatively, the second interface 209 may comprise an EMV chip, an NFC interface (e.g., an RFID transmitter), or a Bluetooth® transmitter. The terminal 210 may have an interface that corresponds to the second interface 209 on the secondary card 205 in order to read data (e.g., account information associated with the account of the first user, authentication information) from the secondary card 205. The terminal 210 may be configured to send transaction requests associated with the secondary card 205 to the server 220 for approval.

Biometric information associated with the second user may be collected again during the transaction process. The biometric information may be collected via the biometric sensor 208 in a way similar to as discussed above, or be collected via a biometric sensor associated with the terminal 210, or via any other devices (e.g., the first user device 201 or the second user device). If the biometric information is collected via the secondary card 205, the biometric information may be sent to the server 220 via the terminal 210 (e.g., the biometric information is sent via the second network interface 209 to the terminal, and then the terminal 210 sent the biometric information to the server 220 via the network 215). Alternatively, the biometric information may be sent by the secondary card 205 to the server 220 via the network 215 directly.

The server 220 may determine, based on a comparison between the biometric information collected during the transaction process and the biometric information collected during the delegation process, to approve or decline the transaction request.

The network 215 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

The data transferred to and from various computing devices in computing environment 200 may include secure and sensitive data, such as confidential documents, customer personally identifiable information, and account data. Therefore, it may be desirable to protect transmissions of such data using secure network protocols and encryption, and/or to protect the integrity of the data when stored on various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the computing environment 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the computing environment 200 in front of one or more computing devices such that any external devices may communicate directly with the specialized hardware.

FIG. 3 depicts a flow diagram of an example method 300 for authenticating card usage. Some or all of the steps of method 300 may be performed using a system that comprises one or more computing devices as described herein, including, for example, computing device 101 as described in FIG. 1, or the first user device 201, the primary card 203, the secondary card 205, terminal 210, server 220, and/or database 225 as described in FIG. 2. The steps of method 300 may be modified, omitted, and/or performed in other orders, and/or other steps may be added.

At step 305, the system may receive, from a first user device 201 associated with a first user, a delegation request to delegate an authority, to a second user, to use a secondary card 205 associated with an account belonging to the first user. The first user may hold a primary card 203 associated with the account.

For example, the first user may hold a bank account and a credit card associated with that bank account as a primary card 203. The first user may want to authorize a second user (e.g., the first user's kid) to purchase some items from a nearby store and therefore may want to delegate an authority, to the second user, to use the first user's bank account. However, the second user may not be able to use the primary card 203 because the primary card 203 may be issued to the first user and only allowed to be used by the first user (e.g., a signature of the first user may be required to authenticate the transaction made via the primary credit card). The first user may not want to provide the primary card 203 to the second user either because the first user may be worried that the second user would use the primary card 203 out of the permitted scope. In order to delegate the authority to the second user, the first user may provide a secondary card 205 to the second user. The secondary card 205 may be a smart card as described in FIG. 2. One or more of the secondary cards 205 may be issued by a financial institution (e.g., a bank, credit card lender, etc.) and sent to the first user. When the one or more secondary cards 205 are received by the first user, the secondary cards 205 may be linked with the first user's account.

If the secondary card 205 has not been linked to any account yet, the first user may link the secondary card 205 to the first user's account via the first user device 201. FIG. 4A shows an exemplary user interface 401 on the first user device 201 while the first user links the secondary card 205 to the first user's account. After the first user logged in to the account, the user interface 401 may display an account ID "abc." A prompt may be displayed to the first user to take a photo of the secondary card 205 that the first user wants to link to the account. The prompt may have guidelines 402 for the first user to frame the secondary card 205. The first user may capture an image of the secondary card, for example, after the secondary card 205 has been framed in the guidelines 402. After the first user takes a photo of the secondary card 205, the information (e.g., card ID) associated with the secondary card 205 may be recorded and linked to an account of the first user. The information associated with the secondary card 205 may be sent to the server 220, for example, via the first user device 201.

The delegation request may comprise one or more limitations on the authority. After the secondary card 205 is linked to the account of the first user, the first user may be prompted to set up one or more limitations on the authority to use the account. The one or more limitations may be set up via the first user device 201. The one or more limitations may comprise at least one of a time period during which the second user is authorized to use the secondary card, a geographical area within which the second user is authorized to use the secondary card, an amount that the second user is authorized to spend, a number of transactions for which the second user is authorized to use the secondary card, or a type of transaction that the second user is authorized to request via the secondary card 205.

Figure 4B:
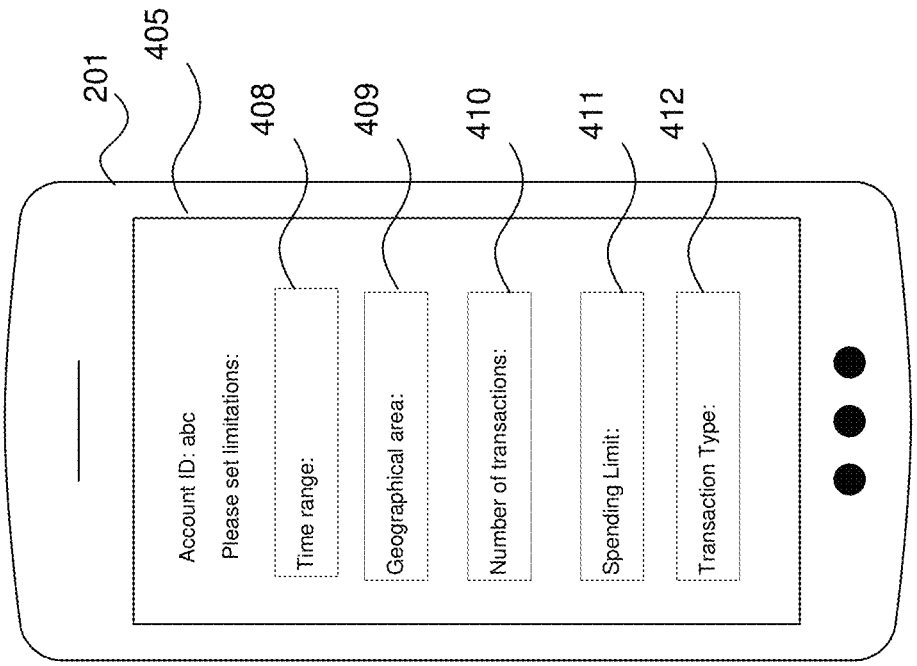
FIG. 4A and FIG. 4B show exemplary user device interfaces in accordance with one or more aspects discussed herein.
Figure 4A:
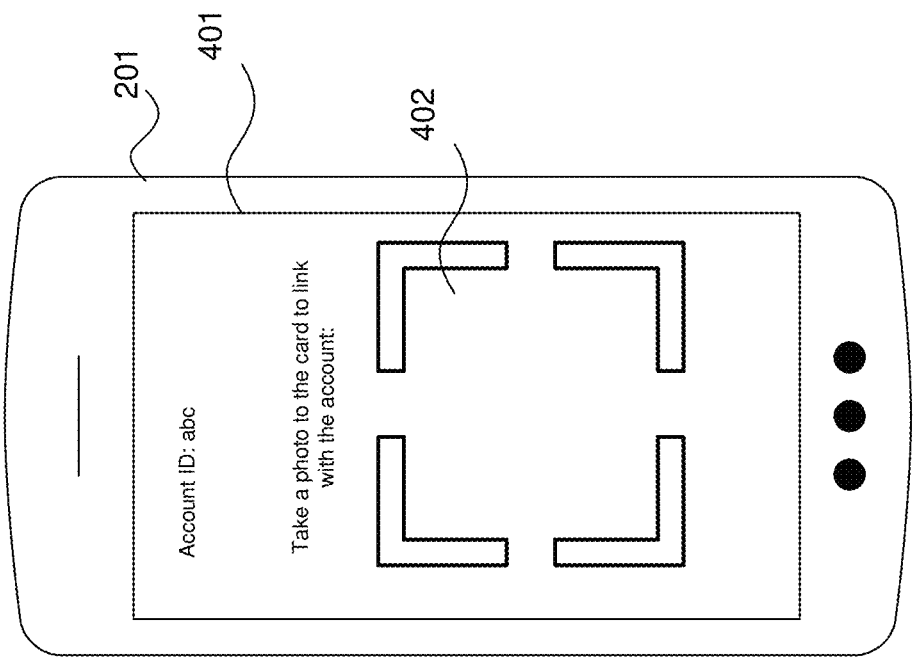

FIG. 4B shows an exemplary user interface 405 that allows the first user to set up the one or more limitations. As shown in FIG. 4B, a first input box 408 may allow the first user to set up a time period during which the second user is authorized to use the secondary card 205. The first user may allow the second user to use the secondary card 205 during certain days or hours (e.g., the second user is authorized to use the secondary card 205 during the next 24 hours). A second input box 409 may allow the first user to set up a geographical area within which the second user is authorized to use the secondary card 205. For example, the first user may allow the second user to use the secondary card 205 within 20 miles from the first user's home. A third input box 410 may allow the first user to set up a number of transactions for which the second user is authorized to use the secondary card. For example, the first user may allow the second user to use the secondary card 205 to make no more than 10 transaction requests. A fourth input box 411 may allow the first user to set up an amount that the second user is authorized to spend. A fifth input box 412 may allow the first user to set up a type of transaction that the second user is authorized to request. For example, the first user may limit the second user to use the secondary card 205 to purchase a certain type of product (e.g., medical products) or to purchase at a merchant belonging to a certain category (e.g., a pharmacy). The category of limitations and the values of each limitation are merely examples, and other limitations are possible.

The delegation request may also comprise an instruction to automatically make an additional transaction with a second account under certain circumstances. The second account may be an account held by the second user (e.g., a bank account of the second user). The additional transaction may be a transaction to transfer money to the second account during or after the second user uses the secondary card 205 according to the delegation. For example, if the second user makes an original transaction request via the secondary card 205 as discussed below at step 340 (e.g., if the second user uses the secondary card 205 to purchase an item at a nearby store for the first user), an additional transaction to transfer, to the second account, a certain amount of money (e.g., 10 dollars) or to transfer an amount of money equal to a certain percentage of the original transaction (e.g., 5% of the purchase price of the item) may be automatically made based on the instruction in the delegation request. The additional transaction may be made as a reward for the second user's effort to help the first user to make the original transaction.

At step 310, the system may receive first biometric information associated with the second user. As discussed above in FIG. 2, the first biometric information may be received via the first user device 201, a sensor 208 on the secondary card 205, a second user device associated with the second user, or other computing devices. For example, the first biometric information may be a photo of the second user taken, for example, using a camera of the first user device 201. For example, the second user may touch the biometric sensor 208 with the finger of the second user in order to have the fingerprint collected by the secondary card 205. In another example, the first biometric information may be collected via a second user device associated with the second user. The second user device may receive a secure link from the system, and the biometric information collected may be sent to the system via the secured link.

Figure 5B:
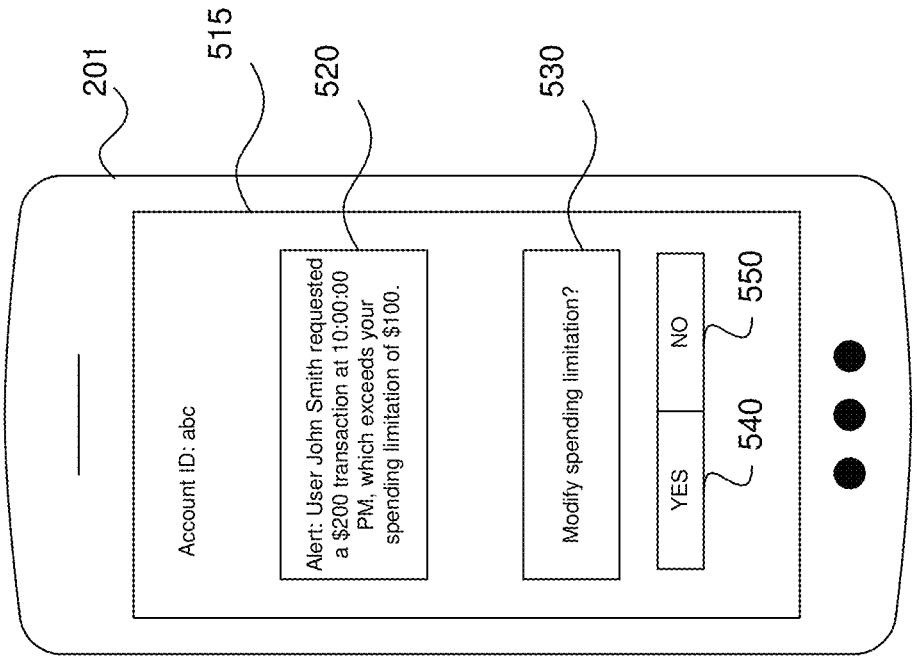
FIG. 5A and FIG. 5B exemplary user device interfaces in accordance with one or more aspects discussed herein.
Figure 5A:
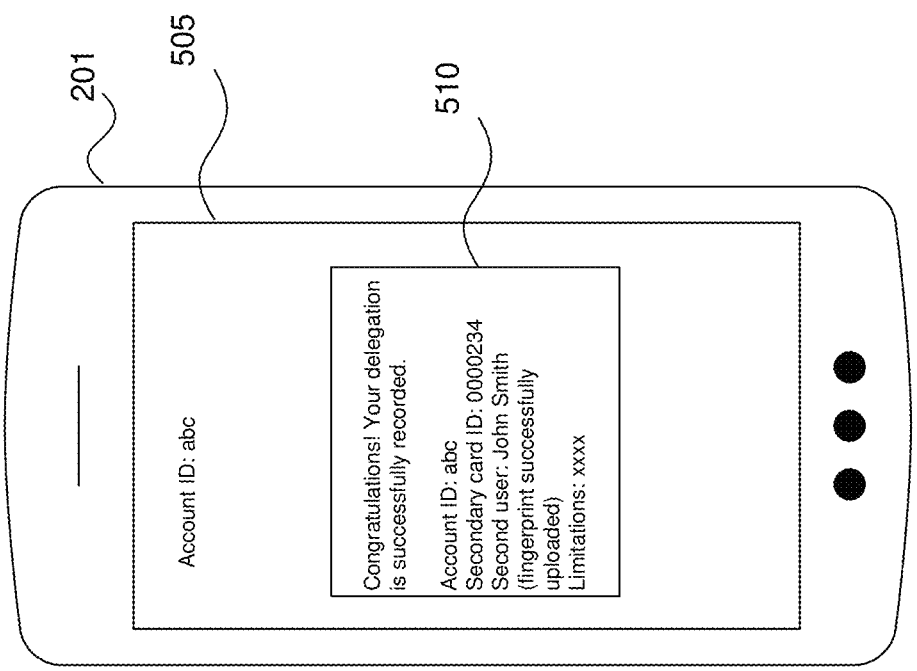

At step 315, the system may store, in a database, a mapping between the account, the first biometric information, the secondary card 205, and/or the one or more limitations. The delegation process may be completed after the mapping is stored. FIG. 5A shows an exemplary user interface 505 after the delegation process is completed. As is shown in FIG. 5A, a dialog window 510 may be displayed via the user interface 505 on the first user device 201 showing "Congratulations! Your delegation is successfully recorded." The dialog window 510 may also display at least a portion of information associated with the mapping. As may be shown in FIG. 5A, the dialog window 510 may display "Account ID: abc; Secondary card ID: 0000234; Second user: John Smith (fingerprint successfully uploaded); Limitations: xxxx."

If the first user wants to delegate the authority to use the account of the first user to multiple users, the first user may provide different users with different secondary cards 205, or the first user may provide the same secondary card 205 to different users during different time periods. If the first user uses the same secondary card 205 to delegate the authority, to multiple users, to use the account of the first user, multiple mappings associated with the same account and secondary card 205 may be stored by the system. For example, the first user may delegate the authority to use the first user's account to the second user, and may also delegate the authority to use the account to a third user. The delegation process for the third user may be similar to as discussed above. The system may also store another mapping between the account, biometric information of the third user, the secondary card 205, and/or one or more limitations. As discussed below, if the system receives a transaction request, the system may first determine the identity of the user who is currently using the secondary card 205, and then determine whether the transaction request is within the one or more limitations set up to the particular user.

At step 320, the system may receive a transaction request associated with the secondary card 205. The transaction request may be made via a terminal 210 as described in FIG. 2. The transaction request may comprise the second biometric information. As discussed above in FIG. 2, the second biometric information may be obtained (e.g., collected, received) while the transaction request is made, and may be obtained (e.g., collected, received) by either terminal 210, by a biometric sensor 208 on the secondary card 205, or by other computing devices communicating with the system. Consistent with the bank account example described above, after the first user delegates the authority to use the first user's bank account to the second user, the second user may bring the secondary card 205 to a nearby store to purchase items for the first user. If the second user attempts to make payment via the secondary card 205, a second biometric information of the second user may be obtained (e.g., collected, received).

At step 325, the system may determine whether the second biometric information matches the first biometric information by comparing the second biometric information to the first biometric information. As discussed above, the first biometric information may be the biometric information of the second user that was stored during the delegation process. The second biometric information may be obtained (e.g., collected, received) while the transaction request is made. In the example where multiple users are authorized to use the same secondary card 205, the system may first determine which user is currently using that secondary card 205, and then determine the mapping associated with that particular user. The system may determine which user is currently using the secondary card 205 in a variety of ways. For example, a user ID may be assigned to each user. The user who makes transaction request via the secondary card 205 may be requested to input the user ID. For another example, each user may be authorized to use the secondary card 205 during a different time period. The different time periods may be set up as one of the one or more limitations discussed above. The system may determine the current time period and assume the user who is authorized to use the secondary card 205 at the current time is the user who is currently using the secondary card 205.

If the system determines the second biometric information does not match the first biometric information, the method may proceed to step 360. At step 360, the system may decline the transaction request. An alert may be sent to the first user indicating that a suspected transaction has been declined. The alert may be sent to the first user device 201, for example, via an electronic communication, such as a push notification, a text message, an email, or the like.

However, if the system determines the second biometric information matches the first biometric information, the method may proceed to step 335. At step 335, the system may retrieve, from the database and based on a determination that the second biometric information matches the first biometric information, the one or more limitations. As discussed above, the one or more limitations may comprise at least one of a time period during which the second user is authorized to use the secondary card, a geographical area within which the second user is authorized to use the secondary card, an amount for which the second user is authorized to spend, or a number of transactions for which the second user is authorized to use the secondary card.

At step 340, the system may determine whether the transaction request conforms with the one or more limitations. If the system determines the transaction request conforms with the one or more limitations, the method may proceed to step 345.

At step 345, the system may approve the transaction request. The system may generate instructions based on the type of requested transaction. For example, if the transaction request is a payment request associated with a bank account, the system may approve the transaction request by transferring the amount of money requested from the first user's account to the recipient's account. For another example, if the transaction request is a request to get access to a building, the system may approve the transaction request by sending an instruction to a receiver on the door of the building to open the lock on the door.

If an instruction to automatically make an additional transaction with a second account (e.g., an account of the second user) was included in the delegation request as discussed above at step 305, the system may also make the additional transaction based on the instruction in the delegation request.

Referring back to step 340, if the system determines the transaction request does not conform with the one or more limitations, the method may proceed to step 350. At step 350, the system may send, to the first user, an alert indicating that a transaction request has been made by the second user and the transaction exceeds the one or more limitations. The alert may comprise an electronic communication, such as those described above, that includes a prompt to modify the one or more limitations. FIG. 5B shows an exemplary user interface 515 on the first user device 201 that displays the alert. As shown in FIG. 5B, the user interface 515 may comprise two dialog windows. A first dialog window 520 may indicate "Alert: User John Smith requested a $200 transaction at 10:00:00 PM, which exceeds your spending limitation of $100." A second dialog window 530 may indicate "Modify spending limitation?" Two option buttons 540 and 550 may be displayed below the second dialog window 530. If the first user selects the "YES" button 540, an input window may be displayed to allow the first user to adjust the spending limitation. If the first user selects the "NO" button 550, it may indicate the first user does not want to change the limitations.

At step 355, the system may determine whether a response comprising an indication to modify the one or more limitations has been received during a predetermined period of time (e.g., 5 minutes). For example, the response may be sent to the server 220 from the first user device 201, after the first user selects the "YES" button 540. The system may modify the limitations accordingly. If such a response is not received during a predetermined period of time or if a response is received but the transaction still exceeds the modified limitations, the method may proceed to step 360 to decline the transaction request. If such a response is received and if the transaction request conforms with the modified limitations, the method may proceed to step 345 to approve the transaction request.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, by a server and from a first computing device associated with a primary user, a delegation request to delegate an authority, to a second user, to use a secondary card associated with a primary account belonging to the primary user, wherein:
      the primary user holds a primary card and the secondary card associated with the primary account; and
      the delegation request comprises one or more limitations on the authority;
   determining by the server and based on receiving the delegation request, whether the secondary card is linked to a financial account;
   receiving, by the server from the first computing device, an image of the secondary card;
   linking, by the server, based on the image of the secondary card, and based on a determination that the secondary card is not linked, the secondary card with the primary account;
   receiving, by the server from the first computing device and via a sensor on the secondary card, first biometric information associated with the second user, wherein the secondary card provides the first biometric information to the first computing device via a short-range wireless protocol;
   receiving, by the server, a transaction request associated with the secondary card, wherein the transaction request comprises second biometric information;
   based on a determination that the second biometric information matches the first biometric information, obtaining the one or more limitations;
   based on a determination that the transaction request conforms with at least the one or more limitations, approving, by the server, the transaction request;
   based on a determination that the transaction request was successfully completed, approving an additional transaction request, wherein the additional transaction request comprises a request to transfer an amount equal to a percentage of an amount of a first transaction from the primary account into an account associated with the second user, wherein the account associated with the second user is not associated with the primary user;
   receiving, by the server from the first computing device, an indication to remove the delegation request; and
   removing, by the server and based on receiving the indication, the link between the secondary card and the primary account.

2. The computer-implemented method of claim 1, wherein the one or more limitations comprises at least one of:
   a spending limitation amount for which the second user is authorized to use the secondary card;
   a time period during which the second user is authorized to use the secondary card;
   a geographical area within which the second user is authorized to use the secondary card; or
   a number of transactions for which the second user is authorized to use the secondary card.

3. The computer-implemented method of claim 1, wherein linking the secondary card with the primary account further comprises:
   causing, by the server, a first interface to be displayed by the first computing device, wherein the first interface is configured to capture the image of the secondary card.

4. The computer-implemented method of claim 1, wherein obtaining the one or more limitations comprises:
   retrieving, from a database, one or more initial limitations; and
   based on a determination that the transaction request does not conform to the one or more initial limitations, modifying the one or more initial limitations into the one or more limitations.

5. The computer-implemented method of claim 1, further comprising:
   receiving a second transaction request associated with the secondary card, wherein the second transaction request comprises third biometric information;
   based on a determination that the third biometric information matches the first biometric information, retrieving, from a database, the one or more limitations; and
   based on a determination that the second transaction request exceeds the one or more limitations, sending, to the primary user, an alert.

6. The computer-implemented method of claim 5, wherein the alert comprises a prompt to modify the one or more limitations.

7. The computer-implemented method of claim 1, wherein the first biometric information associated with the second user is received via a secured link.

8. A system comprising:
   a first computing device associated with a primary user, and
   a second computing device;
   wherein the second computing device comprises a second processor and second memory, the second computing device configured to:
      receive, from the first computing device, a delegation request to delegate an authority, to a second user, to use a secondary card associated with a primary account belonging to the primary user, wherein:
         the primary user holds a primary card and the secondary card associated with the primary account; and
         the delegation request comprises one or more limitations on the authority;
      determine, based on receiving the delegation request, whether the secondary card is linked to a financial account;
      receive, from the first computing device, an image of the secondary card;
      link, the image of the secondary card and based on a determination that the secondary card is not linked, the secondary card with the primary account;
      receive, via a sensor on the secondary card, first biometric information associated with the second user, wherein the secondary card provides the first biometric information to the first computing device via a short-range wireless protocol;
      receive a transaction request associated with the secondary card, wherein the transaction request comprises second biometric information;
      based on a determination that the second biometric information matches the first biometric information, obtain the one or more limitations;

based on a determination that the transaction request conforms with at least the one or more limitations, approve the transaction request;

based on a determination that the transaction request was successfully completed, approve an additional transaction request, wherein the additional transaction request comprises a request to transfer an amount equal to a percentage of an amount of a first transaction into an account associated with the second user, wherein the account associated with the second user is not associated with the primary user;

receive, from the first computing device, an indication to remove the delegation request;

remove, based on receiving the indication, the link between the secondary card and the primary account; and wherein the first computing device comprises a first processor and first memory, the first computing device configured to:

send, to the second computing device, the delegation request.

9. The system of claim 8, wherein the one or more limitations further comprises at least one of:

a spending limitation amount for which the second user is authorized to use the secondary card;

a time period during which the second user is authorized to use the secondary card;

a geographical area within which the second user is authorized to use the secondary card; or a number of transactions for which the second user is authorized to use the secondary card.

10. The system of claim 8, wherein the second computing device is further configured to:

based on the determination that the second biometric information matches the first biometric information, retrieve, from a database, one or more initial limitations; and based on a determination that the transaction request does not conform to the one or more initial limitations, modify the one or more initial limitations into the one or more limitations.

11. The system of claim 8, wherein the second computing device is further configured to:

cause a first interface to be displayed by the first computing device, wherein the first interface is configured to capture the image of the secondary card and comprises guidelines to frame the secondary card.

12. The system of claim 8, wherein the second computing device is further configured to:

receive a second transaction request associated with the secondary card, wherein the second transaction request comprises third biometric information;

based on a determination that the third biometric information matches the first biometric information, retrieve, from a database, the one or more limitations; and based on a determination that the second transaction request exceeds the one or more limitations, send, to the primary user, an alert.

13. The system of claim 12, wherein the alert comprises a prompt to modify the one or more limitations.

14. The system of claim 13, wherein the second computing device is further configured to:

receive, from the first computing device, a response to the alert, wherein the response comprises an indication to modify the one or more limitations; and approve, based on the response, the second transaction request.

15. A non-transitory computer-readable medium storing computer instructions that, when executed by one or more processors, cause performance of actions comprising:

receiving, from a first computing device associated with a primary user, a delegation request to delegate an authority, to a second user, to use a secondary card associated with a primary account belonging to the primary user, wherein:

the primary user holds a primary card and the secondary card associated with the primary account; and the delegation request comprises one or more limitations on the authority;

determining, based on receiving the delegation request, whether the secondary card is linked to a financial account;

receiving, from the first computing device, an image of the secondary card;

linking, based on the image of the secondary card and based on a determination that the secondary card is not linked, the secondary card with the primary account;

receiving, via a sensor on the secondary card, first biometric information associated with the second user, wherein the secondary card provides the first biometric information via a short-range wireless protocol;

receiving a transaction request associated with the secondary card, wherein the transaction request comprises second biometric information;

based on a determination that the second biometric information matches the first biometric information, obtaining the one or more limitations;

based on a determination that the transaction request conforms with at least the one or more limitations, approving the transaction request; and based on a determination that the transaction request was successfully completed, approving an additional transaction request, wherein the additional transaction request comprises a request to transfer an amount equal to a percentage of an amount of a first transaction from the primary account into an account associated with the second user, wherein the account associated with the second user is not associated with the primary user;

receiving, from the first computing device, an indication to remove the delegation request; and removing, based on receiving the indication, the link between the secondary card and the primary account.

16. The non-transitory computer-readable medium of claim 15, further comprising:

displaying, on the first computing device, one or more input boxes for modifying the one or more limitations; and wherein the one or more limitations further comprises at least one of:

a spending limitation amount for which the second user is authorized to use the secondary card;

a time period during which the second user is authorized to use the secondary card;

a geographical area within which the second user is authorized to use the secondary card; or a number of transactions for which the second user is authorized to use the secondary card.

17. The non-transitory computer-readable medium of claim 15, wherein the (Original) computer instructions, when executed by the one or more processors, cause performance of actions comprising:

based on the determination that the second biometric information matches the first biometric information, retrieve, from a database, one or more initial limitations; and based on a determination that the transaction request does not conform to the one or more initial limitations, modify the one or more initial limitations into the one or more limitations.

18. The non-transitory computer-readable medium of claim 17, the computer instructions, when executed by the one or more processors, cause performance of actions comprising:

receiving a third transaction request associated with the secondary card, wherein the third transaction request comprises fourth biometric information;

retrieving, from a database and based on a determination that the fourth biometric information matches the first biometric information, the one or more limitations; and based on a determination that the third transaction request exceeds the one or more limitations, sending, to the primary user, an alert.

19. The non-transitory computer-readable medium of claim 18, wherein the alert comprises a prompt to modify the one or more limitations.

20. The non-transitory computer-readable medium of claim 15, wherein the percentage of the amount of the first transaction comprises 5%.

* * * * *